UNITED STATES PATENT OFFICE.

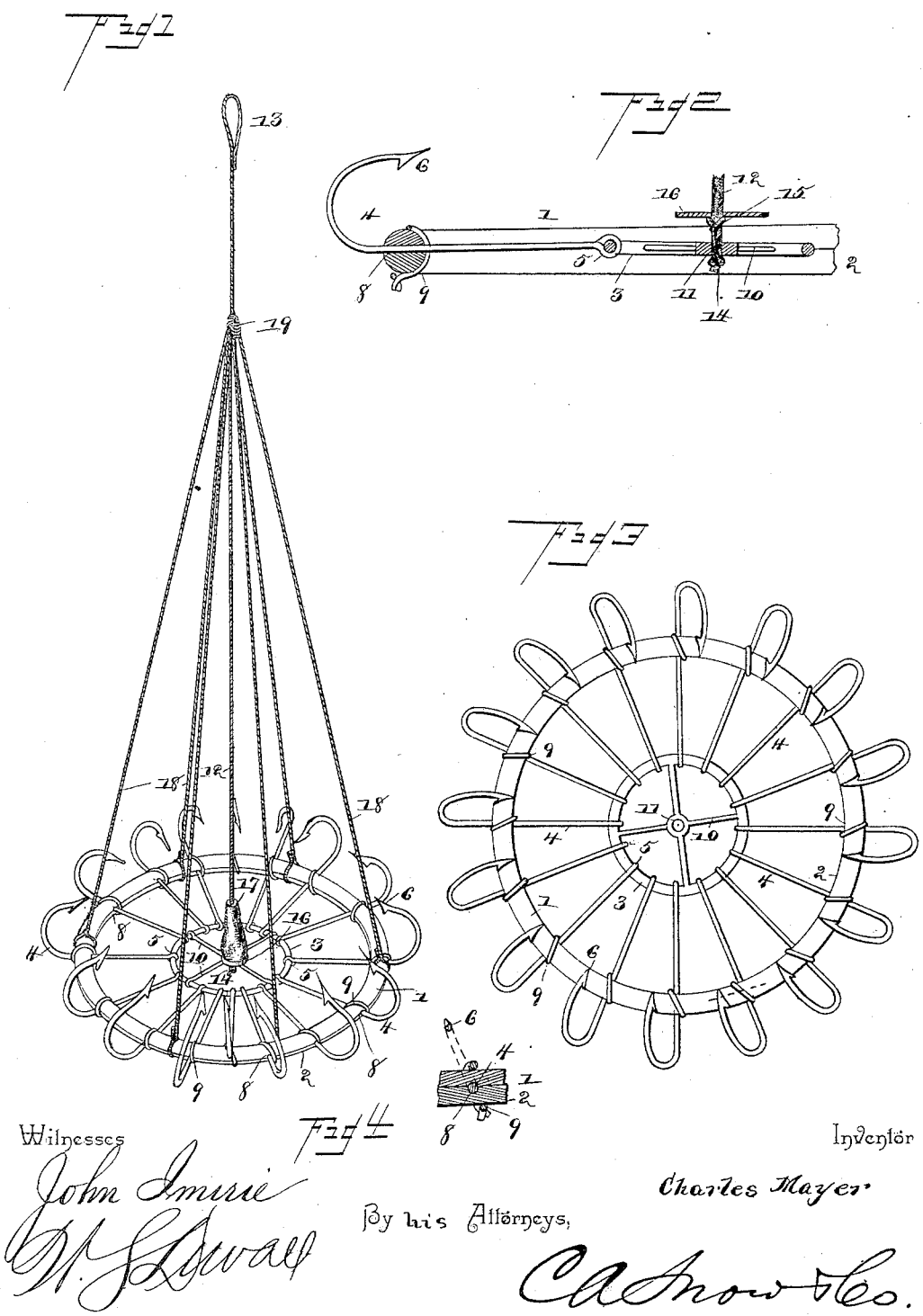

CHARLES MAYER, OF EL PASO, TEXAS.

FISHING-TACKLE.

SPECIFICATION forming part of Letters Patent No. 419,054, dated January 7, 1890.

Application filed August 28, 1889. Serial No. 322,229. (No model.)

*To all whom it may concern:*

Be it known that I, CHARLES MAYER, a citizen of the United States, residing at El Paso, in the county of El Paso and State of Texas, have invented a new and useful Fishing-Tackle, of which the following is a specification.

This invention has relation to fishing-tackle, and has special reference to the hooks thereof or snaring devices; and among the objects in view are to provide a snaring device which will, so far as possible, insure a capture; to so arrange the hooks as to prevent a loss of bait, and to provide a device capable of ensnaring as many fish as may at the time of lifting the snare be nibbling at the bait.

With these general objects in view the invention consists in a spacing-ring, preferably formed of lead or other heavy metal and having a central hub and having a series of hooks radiating from the hub and secured to the ring, and in locating above the hub and at the center of the series of hooks a bait-support, whereby access thereto is impossible without the prey getting directly over and in line with the points of the hooks.

Other features of construction will hereinafter appear, and be pointed out more particularly in the appended claims.

Referring to the drawings, Figure 1 is a perspective of a snare constructed in accordance with my invention; Fig. 2, a transverse section, the bait-support thereon. Fig. 3 is a plan. Fig. 4 is a sectional detail to show the construction of the outer ring.

Like numerals of reference indicate like parts in all the figures of the drawings.

In practicing my invention I provide an outer ring 1, divided longitudinally into sections 2, and preferably form the same of lead, whereby said ring acts not only as a support for the hooks, as will be hereinafter apparent, but which also serves the double function of a sinker.

3 represents an inner or hub ring, and from the same radiate any number of suitable fish-hooks 4, the eyes 5, formed at the rear ends of the hooks, engaging the ring, and the hook portions 6 thereof projecting beyond the ring 1 and terminating above the same and about in line therewith. The ends of the hooks are divergent or disposed to one side of their thanks and radially from a common center, and the sections 2 of the ring are permitted so tightly clamp the shanks of the hooks by reason of half-grooves formed in each section and designated as 8, the grooves of one section corresponding with those of the other section and forming small openings for the passage of the shanks. The clamping-sections 2 are secured tightly in position upon the shanks by means of wire loops 9, crossing the points of connection between the shanks and sections. Radial bars 10 intersect each other at the center of the ring 3, and have their ends bent to engage the ring, and at their points of intersection form a central eye 11.

12 represents the snood, which terminates at its upper end in a loop 13, to which is engaged the lower end of the fishing-line. The lower end of the snood is knotted after being passed through the eye 11, as at 14, to prevent its slipping therefrom. A knot 15 is formed above the eye 11 in the cord 12 and supports a centrally-perforated bait button or pan 16, upon which is mounted the bait 17, the bait in this instance being much larger than that which is usually used, and is tied or threaded on the cord 12, so as to serve for a good many hauls.

18 represents a series of supporting-cords, the lower ends of which are knotted around the outer ring 1 at suitable distances apart, and the upper ends of which are bunched and connected to the cord 12 at a suitable point above the hooks, as at 19.

The operation of my invention will be readily apparent from the above description, and is as follows: The snare, having been baited, is lowered to the bottom of the water or a sufficient distance thereabove, in accordance with the habits of fish desired to be captured, and any fish nibbling at the bait will, by reason of the bait-pan, move the cord 12. This will notify the fisherman, and, by a quick movement of the line, the gills of the fish are engaged by one of the hooks and he may be safely landed. Any wiggling he may do is very likely to cause his other gill to be caught by an adjacent hook.

By reason of the divergence of the ends of the hooks it will be seen that each hook projects into the space intermediate it and the next adjacent hook, so that no unobstructed passages are formed by which the fish may withdraw his head.

Having described my invention, what I claim is—

1. A snare comprising an outer ring, an inner hub, and a series of hooks radiating from the hub and secured to the ring, the outer ends of the hooks terminating above the ring and at about the center of the space intermediate its own and the shank of the next adjacent hook, substantially as specified.

2. In a snare, an outer ring longitudinally divided to form clamping-sections, and a series of hooks, the shanks of which radiate from and are secured in the center and are clamped between the sections of the outer ring, substantially as specified.

3. In a snare, the combination, with an outer ring longitudinally divided to form clamping-sections and an inner hub-ring, of a series of hooks terminating at their inner ends in eyes engaging the hub-ring and their shanks clamped by the sections of the outer ring, substantially as specified.

4. In a snare, an outer hook-supporting ring having a series of radially-disposed hooks, the inner ends of which terminate in eyes, in combination with an inner hub-ring engaging the eyes, a snood loosely connected to the ring, and a series of outer cords having their lower ends connected to the outer ring and their upper ends with the centrally-located snood, substantially as specified.

5. In a snare, the combination, with the central hub-ring having the central eye 11, and the snood 12, engaging the eye, of the outer ring 1, formed in sections 2, and a series of hooks, the shanks of which at their inner ends terminate in eyes engaging the hub-ring and are clamped by the sections 2, wire ties for connecting the sections, and a series of supporting-cords connected with the outer ring at its lower end and at their upper ends with the snood 12, substantially as specified.

6. In a snare, the inner ring 3, combined with the outer sectional ring, and the radiating hooks secured rigidly to the inner ring and clamped between the sections of the outer ring, the ends of the hooks curving outward and upward above the outer ring, as set forth.

In testimony that I claim the foregoing as my own I have hereto affixed my signature in presence of two witnesses.

CHARLES MAYER.

Witnesses:
PETER DEHLINGER,
MAX MERKENSY.